2 Sheets—Sheet 1.

W. DYER.
BREAST-PLATES FOR HARNESS.

No. 188,462.  Patented March 20, 1877.

Witnesses.
S. N. Piper
L. N. Miller

William Dyer.
by his attorney.
R. N. Eddy.

2 Sheets—Sheet 2.

W. DYER.
BREAST-PLATES FOR HARNESS

No. 188,462. Patented March 20, 1877.

Witnesses
S. W. Piper
L. H. Miller

William Dyer.
By his attorney.
R. H. Eddy

UNITED STATES PATENT OFFICE.

WILLIAM DYER, OF HYDE PARK, MASSACHUSETTS.

IMPROVEMENT IN BREAST-PLATES FOR HARNESS.

Specification forming part of Letters Patent No. 188,462, dated March 20, 1877; application filed December 28, 1876.

*To all whom it may concern:*

Be it known that I, WILLIAM DYER, of Hyde Park, of the county of Norfolk and State of Massachusetts, have invented a new and useful Improvement in the Breast-Plates of Carriage-Harness; and do hereby declare the same to be fully described in the following specification, and represented in the accompanying drawings, of which—

Figure 1:
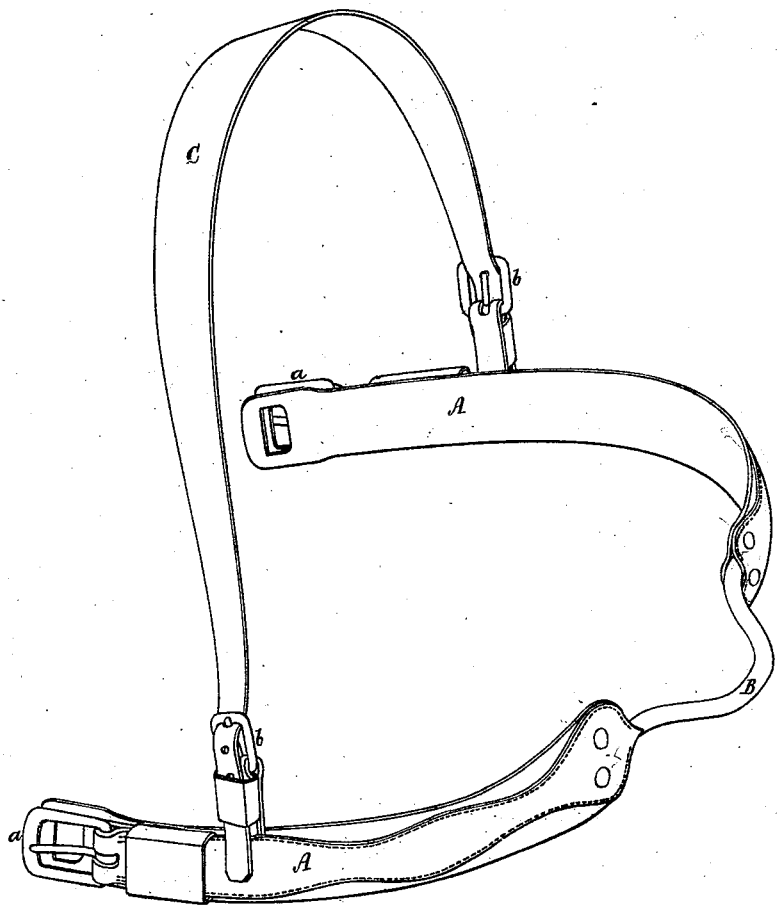
Figure 2:
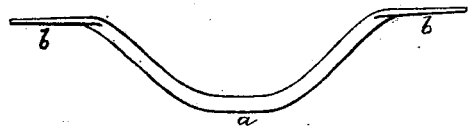
Figure 3:

Figure 1 is a perspective view of a breast-plate of my new or improved kind. Fig. 2 is a top view, and Fig. 3 a front elevation, of the curved metallic bridge, to be hereinafter described.

The breast-plate, as shown in Fig. 1, is composed of two flexible or leather straps, A A, and an intermediate and connecting rigid arch-piece or bridge, B, of metal or other suitable material, bent or inclined downward so as to stand at an acute angle with the plane of the two straps.

The straps A A are or may be provided with buckles *a a b b*, and a neck-strap, C, arranged, as shown.

The arch-piece B is intended to so span over the wind-pipe or the middle part of the breast of the horse or draft animal that there may be no bearing or pressure of the breast-plate thereon to impede proper and free action of the respiratory organs or the wind-pipe.

This arch-piece is inclined downward to the general plane of the straps A A, in order that it may not compress the wind-pipe of the horse while he may be stretching forward or downward his head and neck. This feature in the arch-piece is a matter of great importance, for were the arch-piece on a level with the side bands or straps it would be much in the way of the throat of the horse while bending his neck down for feeding, drinking, or fast trotting.

The arch-piece is a curved bar, *a*, curved as described, and terminating at its ends, or having two flat ears, *b b*, furnished with rivet-holes *c* in them, as shown. These ears are laid on flatwise, or are inserted within and riveted to the flexile straps, such ears serving not only as a means of connecting the bar *a* to the straps, but to prevent it from tipping up or down, or getting out of its normal position relatively to them while the breast-plate may be in use.

The advantages of the arch-piece are that it relieves the middle part of the breast of the animal from pressure, and causes the breast-plate to bear on the shoulders only, especially when the animal is going on a level or up hill. It admits of the breast-plate being arranged higher on the shoulders than it can as it is usually made, thereby obtaining one advantage of a collar. Furthermore, it enables a whiffletree of the traces of a leading horse to be attached to the breast-plate by its being hooked to the said arch-piece.

I do not claim, broadly, a rigid arch-piece and flexile straps, arranged in one plane, as shown in either of the United States Patents No. 88,838, 30,775. Nor do I claim a rigid arch-piece or bridge, as made in either of the forms shown in the patents No. 120,049, 128,520. As represented in the latter patent the arch-piece is only a round rod used in front of and to stiffen a breast-plate, which extends entirely along such rod. In the patent 120,049 the arch-piece is curved upward, and connected with shoulder-pads, supported by straps going to the saddle, such pads being fastened to the traces.

In neither of these patents is the arch-piece or bridge curved lengthwise, and bent downward, and provided with flat ears, as is the case with my improved arch-piece; therefore

I claim—

As an improved manufacture for use, or in combination with the flexile straps A A, as described, the arch-piece B, having the flat ears and curved lengthwise and downward, in manner as represented and explained.

WILLIAM DYER.

Witnesses:
R. H. EDDY,
J. R. SNOW.